Dec. 11, 1923.
M. J. TOPP
1,476,855
COLLAPSIBLE SAWHORSE
Filed May 6, 1921
3 Sheets-Sheet 1
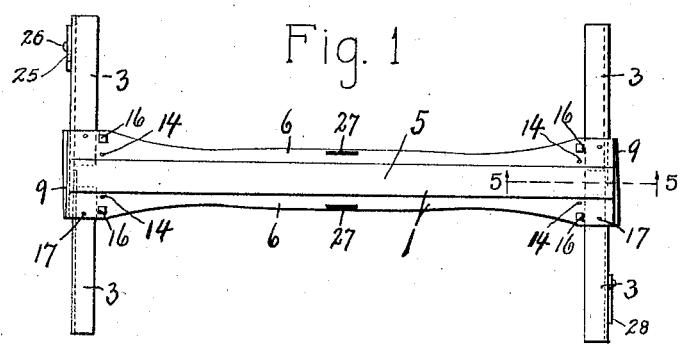
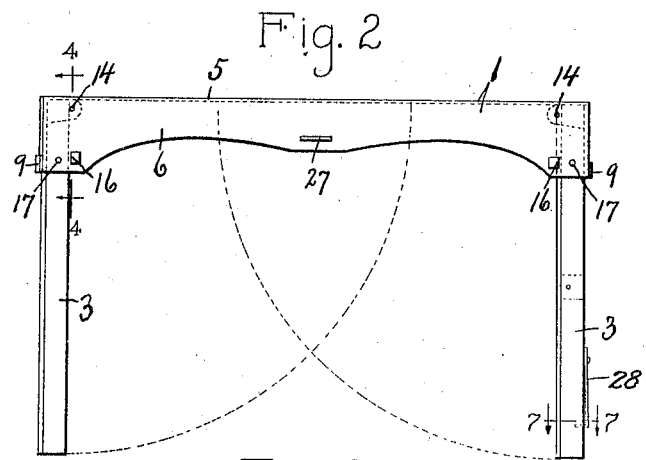
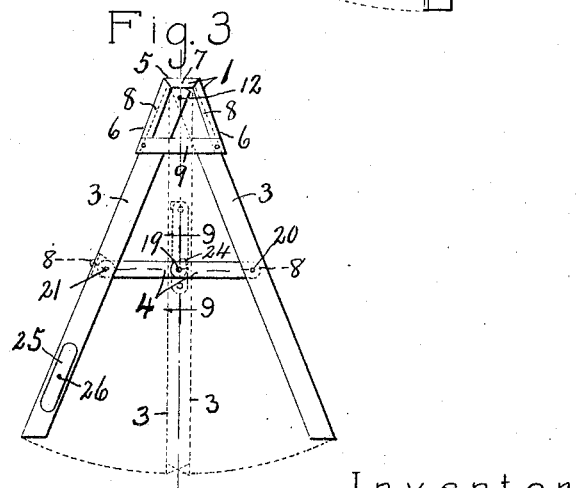
Inventor
M. J. Topp.
By Howard P. Denison
Attorney Dec. 11, 1923.　　　　　1,476,855
M. J. TOPP
COLLAPSIBLE SAWHORSE
Filed May 6, 1921　　　3 Sheets-Sheet 2
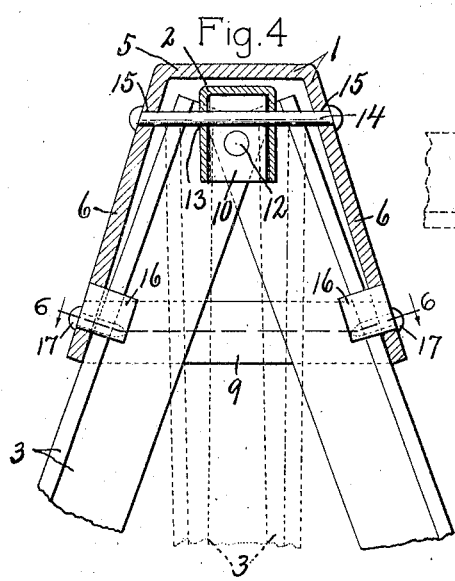
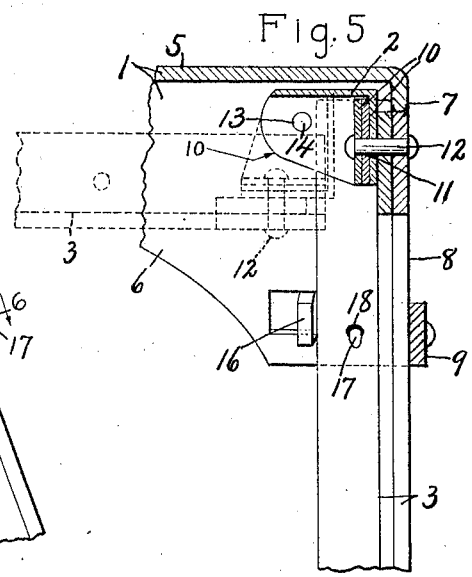
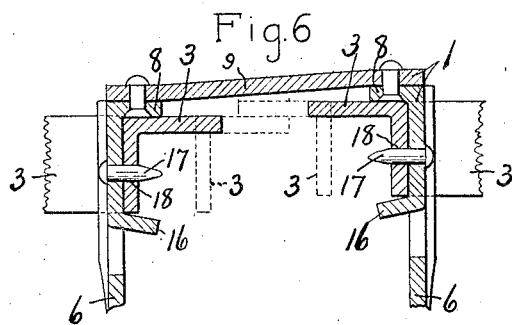
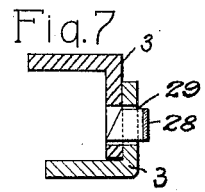
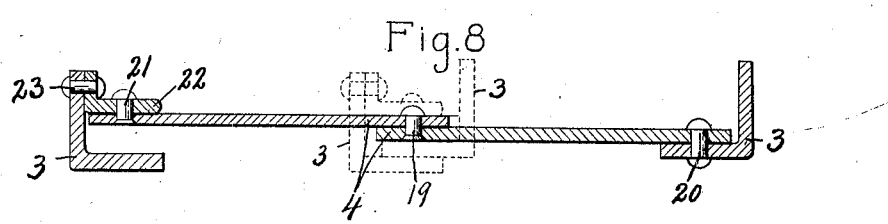
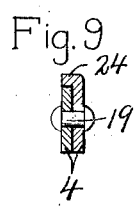
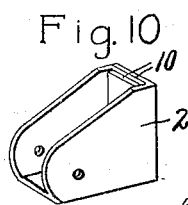

Dec. 11, 1923.
M. J. TOPP
1,476,855
COLLAPSIBLE SAWHORSE
Filed May 6, 1921
3 Sheets-Sheet 3
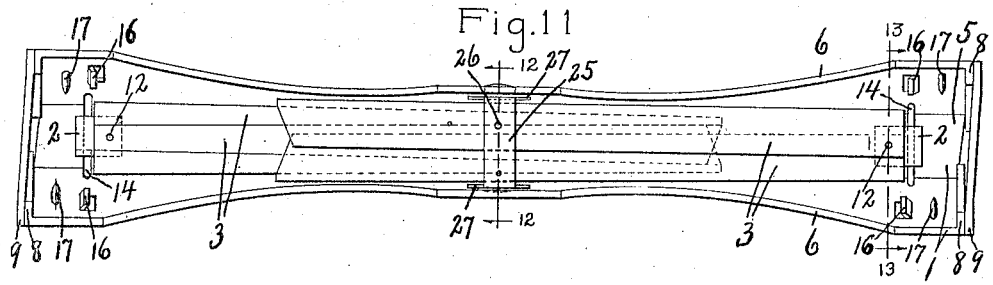
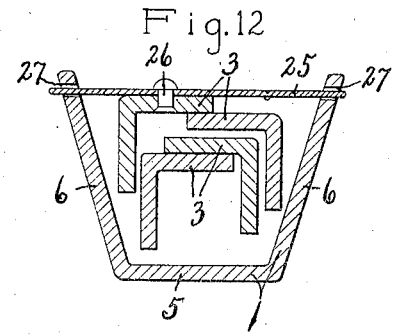
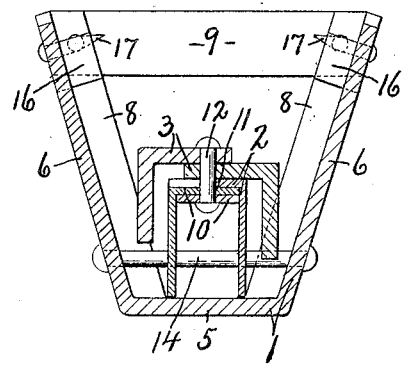
Inventor
M. J. Topp.
By Howard P. Denison
Attorney Patented Dec. 11, 1923.

1,476,855

UNITED STATES PATENT OFFICE.

MAURICE J. TOPP, OF MANLIUS, NEW YORK, ASSIGNOR OF ONE-THIRD TO WILLIAM C. CLARK AND ONE-THIRD TO ALEXANDER R. HAMMERLE, BOTH OF SYRACUSE, NEW YORK.

COLLAPSIBLE SAWHORSE.

Application filed May 6, 1921. Serial No. 467,424.

*To all whom it may concern:*

Be it known that I, MAURICE J. TOPP, of Manlius, in the county of Onondaga, in the State of New York, have invented new and useful Improvements in Collapsible Sawhorses, of which the following, taken in connection with the accompanying drawings, is a full, clear, and exact description.

This invention relates to a collapsible horse commonly known as a "saw-horse" capable of being used for all the purposes to which a device of that character may be put, and is especially useful in dead storage of automobiles for supporting the chassis and relieving the pneumatic tires from the load of the machine.

The main object is to provide a device of this character, which when not in use may be collapsed into a comparatively small compact space for convenience in handling, storage and transportation, and when extended for use will be strong, durable and symmetrical and capable of supporting relatively heavy loads with comparatively little weight in all of its parts.

Other objects and uses relating to specific parts of the device will be brought out in the following description:

In the drawings:

Figures 1, 2 and 3 are, respectively, a top plan, a side elevation and an end view of a horse embodying the various features of my invention.

Figures 4 and 5 are enlarged detail sectional views taken, respectively, on lines 4—4, Figure 2, and 5—5, Figure 1.

Figure 6 is a detail sectional view taken in the plane of line 6—6, Figure 4.

Figure 7 is an enlarged detail sectional view taken on line 7—7, Figure 2.

Figure 8 is an enlarged detail sectional view taken on line 8—8, Figure 3.

Figure 9 is a detail sectional view taken on line 9—9, Figure 3.

Figure 10 is a perspective view of one of the detached yokes for connecting one set of legs with the adjacent end of the top rail.

Figure 11 is an inverted plan of the same horse with the folding parts collapsed within the top rail.

Figures 12 and 13 are enlarged transverse sectional views taken, respectively, on lines 12—12 and 13—13, Figure 11.

As illustrated, practically all of the parts of the device are made of sheet metal and comprise a top rail —1—, a pair of yokes —2— mounted in opposite ends of the rail, opposite pairs of legs —3— attached to their respective yokes —2—, and toggle braces —4— connecting the legs of each pair, all of which parts are assembled in the manner hereinafter described.

The top rail —1— may be of any desired length according to the use to which it is to be put and is preferably made of a single piece of sheet metal bent into the form of an inverted trough or channel-bar having a substantially flat and straight top plate —5— and downwardly diverging or flaring side plates —6— along the longitudinal edges of the top plate —5— and integral therewith to form an intervening lengthwise channel of sufficient length and depth to receive the folded legs —3— within the ends and marginal edges thereof, the end edges of the top plate —5— and side plates or stop flanges —6— being offset relatively short distances downwardly and inwardly to form comparatively narrow abutting flanges or stops —7— and —8— against which the adjacent portions of the legs —3— may rest when extended for use.

The width of the intermediate portion of the side plates —6— is only slightly greater than the transverse width of any one of the legs —3— but the ends of said side plates are of slightly greater width than their intermediate portion for the double purpose of bracing to the top rail and also to afford broader bearing for the adjacent portions of the legs when unfolded or adjusted for use.

The angle between the side plates —6— is determined by the angle at which it is desired to place the legs —3— when adjusted for use, and this latter angle must, of course, be sufficient to brace the entire horse against accidental over turning or rather to enable its feet to embrace a relatively broad area to render the device substantial in use, and in order to better resist the strains of the legs upon the side plates against outward displacement, the opposite ends of said plates are tied together by suitable tie-bars —9— having their ends riveted or otherwise rigidly and permanently secured to the lower ends of the adjacent flanges —8—, as shown in Figures 3 and 6.

The yokes —2— are substantially identical but arranged in reverse order, each consisting of a single piece of sheet metal bent into U-shaped form inverted and having one end of its top portion and the adjacent end of its side portions extended and bent downwardly and laterally, respectively to lap upon each other and thereby to form a triple thickness end wall —10— having a lengthwise opening —11— for receiving and supporting a pivotal pin —12— to which the legs at the adjacent end of the horse are pivoted to swing transversely of the top rail —1—, said yokes being arranged with their closed ends facing the adjacent flanges —8— and their open ends facing inwardly, the opposite sides of each yoke being provided with transversely alined apertures —13— for the reception of a pivotal pin —14— which is secured at its ends in transversely registering apertures —15— in the side plates —6— of the top rail —1— for establishing a pivotal connection between the yoke and top rail and permitting the yoke and legs attached thereto to swing lengthwise of the top rail between the opposite sides —6— thereof.

The legs —3— may be of any suitable length less than the length of the top rail or, more properly, less than the distance between the pivotal pins —14— to enable them to be folded wholly within the length of the channel in the lower side of the top rail and preferably consist of angle plates or bars of substantially the same length, those of each pair being arranged with one of their flanges or sides disposed flatwise relatively to and adjacent the inner face of the corresponding side plates —6— of the top rail with their other flanges or sides close to the inner faces of and parallel with the adjacent ends of the top rail when adjusted for use, the upper ends of the outer flanges or sides of the legs being over-lapped one upon the other and pivoted to each other and to the adjacent end of the yoke —2— by the pivotal bolts —12— so that the over-lapping portions of the legs at the top are interposed between the outer end wall of the yoke and the inner faces of the adjacent flanges —7— and —8— of the top rail —1—, Figures 4, 5 and 6, thereby permitting the outer faces of the upper portions of the legs of each pair to rest against the inner faces of said flanges —7— and —8— when the legs are adjusted for use.

Portions of the side plates —6— near the opposite ends thereof are pressed inwardly to form leg-retaining stops or abutments —16— which are spaced apart from the inner faces of the adjacent flanges or abutments —8— a distance corresponding approximately to the width of the legs and are slightly inclined inwardly to enable the legs to wedge more or less tightly between them and the flanges or abutments —8— when extended to hold the legs against inward rocking movement toward each other about the axes of pivots —14— while permitting the legs of each pair to be moved toward each other about the axis of their pivots —12—, the inward projection of the abutments —16— being relatively short or just sufficient to engage the inner edges of the legs when unfolded against the side plates —6— but are spaced apart transversely a sufficient distance to permit the legs when folded about the axis of the pivot —12— to be folded inwardly and upwardly between them and about the axis of the pivots —14—.

As an additional means for holding the legs in their open position and affording additional support for the top rail —1—, the side plates —6— are provided near the ends thereof with inwardly projecting tapered studs —17— adapted to enter apertures —18— in the adjacent legs of each pair as they are unfolded against the inner faces of the plates —6—, said studs being also sufficiently short to permit the legs to be folded toward each other out of engagement therewith preparatory to folding them inwardly and upwardly into the channel in the under side of the bar —1—.

The toggles —4— serve to hold the legs of both pairs in their extended positions and to additionally brace them against lateral strain, and for this purpose, the toggle levers of each set are over-lapped at their inner ends and pivoted to each other by pivotal bolts —19—, the outer end of one of the toggle levers being connected by pivotal bolt —20— directly to one of the inturned flanges of the adjacent leg, while the outer end of the other toggle lever is pivotally connected at —21— to a supplemental flange —22—, which in turn is secured by rivets —23— to the longitudinally extending flange of the adjacent leg, leaving sufficient clearance between the flange —22— and the transversely extending flange of the corresponding leg to receive the transversely extending flange of the opposite leg together with the adjacent portions of both of the toggle levers, thus permitting the legs to be folded together within a space slightly greater than the width of one of the legs.

One of the levers of the toggles —4— is provided near its inner end with a stop-shoulder —24— adapted to engage the upper edge of the other toggle lever as the legs are unfolded for limiting the downward movement of the flexing joint of the toggles to approximately a horizontal position, and thereby assisting the toggles in bracing the legs against collapse or in their open position.

When the horse is not in use, the toggle joints of the toggles —4— are pressed upwardly by hand, and the legs of each pair are then folded inwardly toward each other out of engagement with the retaining lugs —16— and pins —17—, whereupon each pair of legs folded together and their respective yokes —2— are folded inwardly and upwardly into the channel of the top rail —1— and between the upwardly converging side plates —6—, the folded legs of one set being adjusted within or between the side flanges of the folded legs of the other set where they are locked in place by a button —25—, the latter being pivoted at —26— to one of the legs and having its opposite ends engaging in slots —27— in the opposite plates —6—.

As shown in Figures 2 and 7, the legs of the inner folded set are locked together by means of a spring catch —28—, having one end secured to one of said legs and its other end adapted to enter registering slots —29— in both of the legs of that set.

What I claim is:

1. In a horse of the character described, the combination of a top rail having downwardly flaring lengthwise sides, a pair of yokes pivoted to and between said sides near the ends thereof, separate pairs of legs pivoted to said yokes to swing toward and from each other into and out of engagement with said sides, and toggle connections between the legs of each pair.

2. In a device of the character described, the combination of a top rail having a lengthwise channel in its under side, yokes pivoted to opposite ends of the rail within the channel to swing lengthwise thereof, separate pairs of legs those of each pair being pivoted to each other and to one of said yokes to swing transversely of the top rail toward and from each other into and out of engagement with the side walls of the channel and foldable into and out of the channel, and stop members on the ends of said sides for limiting the outward lengthwise swinging movement of the legs.

3. In a device of the character described, the combination of a top rail having downwardly diverging sides forming an intervening lengthwise channel, yokes pivoted to said sides within the channel to swing lengthwise of the rail, separate pairs of legs, those of each pair being pivoted to each other and to one of the yokes to swing transversely of the rail and against said sides when extended for use, said legs being foldable with the yoke into and out of the channel of the rail, and stops on the sides of the rail for holding the legs in their longitudinally extended positions.

4. In a device of the character described, a top rail having downwardly extending sides in spaced relation to form an intervening channel, stop flanges on the ends of said rail projecting partly across the channel, yokes pivoted to the rail within the channel and near the ends of the rail to swing lengthwise thereof, separate pairs of legs, those of each pair being pivoted to one of said yokes to swing transversely of the rail and resting against said stop flanges when adjusted for use, separate means on each pair of legs for holding them in their extended position against the side walls of the rail, and means on said side walls for holding the legs against said stop flanges.

5. A collapsible horse comprising a top rail having downturned side flanges provided with inturned end flanges, separate pairs of legs, those of each pair being hinged to each other to swing into and out of engagement with and between the side flanges, and connections between the legs and rail to permit the legs of each pair to swing between the side flanges into and out of engagement with the end flanges.

6. A collapsible horse comprising a top rail having downturned side flanges provided with inturned end flanges, separate pairs of legs, those of each pair being hinged to each other to swing into and out of engagement with and between the side flanges, and connections between the legs and rail to permit the legs of each pair to swing between the side flanges into and out of engagement with the said end flanges and stops on the side flanges for holding the legs against the adjacent end flanges.

In witness whereof I have hereunto set my hand this 25th day of April, 1921.

MAURICE J. TOPP.

Witnesses:
H. E. Chase,
M. R. Cooke.